United States Patent
Rummins

[11] Patent Number: 6,112,456
[45] Date of Patent: Sep. 5, 2000

[54] PLANT WATERING SYSTEM

[76] Inventor: John E. Rummins, 105 Heritage Woods Trail, Marietta, S.C. 29661

[21] Appl. No.: 09/090,853

[22] Filed: Jun. 4, 1998

[51] Int. Cl.[7] .................................................. A01G 29/00
[52] U.S. Cl. ............................................................. 47/48.5
[58] Field of Search ................................ 47/48.5, 1.01 R, 47/79

[56] References Cited

U.S. PATENT DOCUMENTS

| | | | |
|---|---|---|---|
| 2,595,782 | 5/1952 | Epstein | 47/48.5 |
| 4,089,133 | 5/1978 | Duncan | 47/48.5 |
| 4,578,897 | 4/1986 | Pazar et al. | 47/48.5 |
| 4,866,880 | 9/1989 | Weinblatt | 47/49 |
| 5,172,515 | 12/1992 | Lapshansky, Sr. et al. | 47/48.5 |
| 5,493,811 | 2/1996 | Tobias et al. | 47/79 |
| 5,542,605 | 8/1996 | Campau | 239/44 |
| 5,568,701 | 10/1996 | Haigler | 47/48.5 |
| 5,896,700 | 4/1999 | McGough | 47/48.5 |

*Primary Examiner*—Robert P. Swiatek
*Assistant Examiner*—Jeffrey L. Gellner
*Attorney, Agent, or Firm*—Cort Flint

[57] ABSTRACT

A plant watering system for feeding the root systems of plants in soil in a timed-release manner for a period of time wherein a tapered, conical watering spike is utilized having radially extending blades for stabilizing the spike in the soil. The watering spike includes a flow reduction reservoir having a metering orifice at an inlet end and a liquid dispensing orifice at an outlet end. Fluid transfer media in the form of compressed cotton is pressed into the flow reduction reservoir to create a reduction in the flow of liquid from the metering orifice to the liquid outlet. At least one blade notch is formed in the spike blades to create an open soil pocket leading from the liquid outlet to the soil for reliable dispensing of liquid in a timed-release manner without clogging of the liquid outlet.

18 Claims, 2 Drawing Sheets

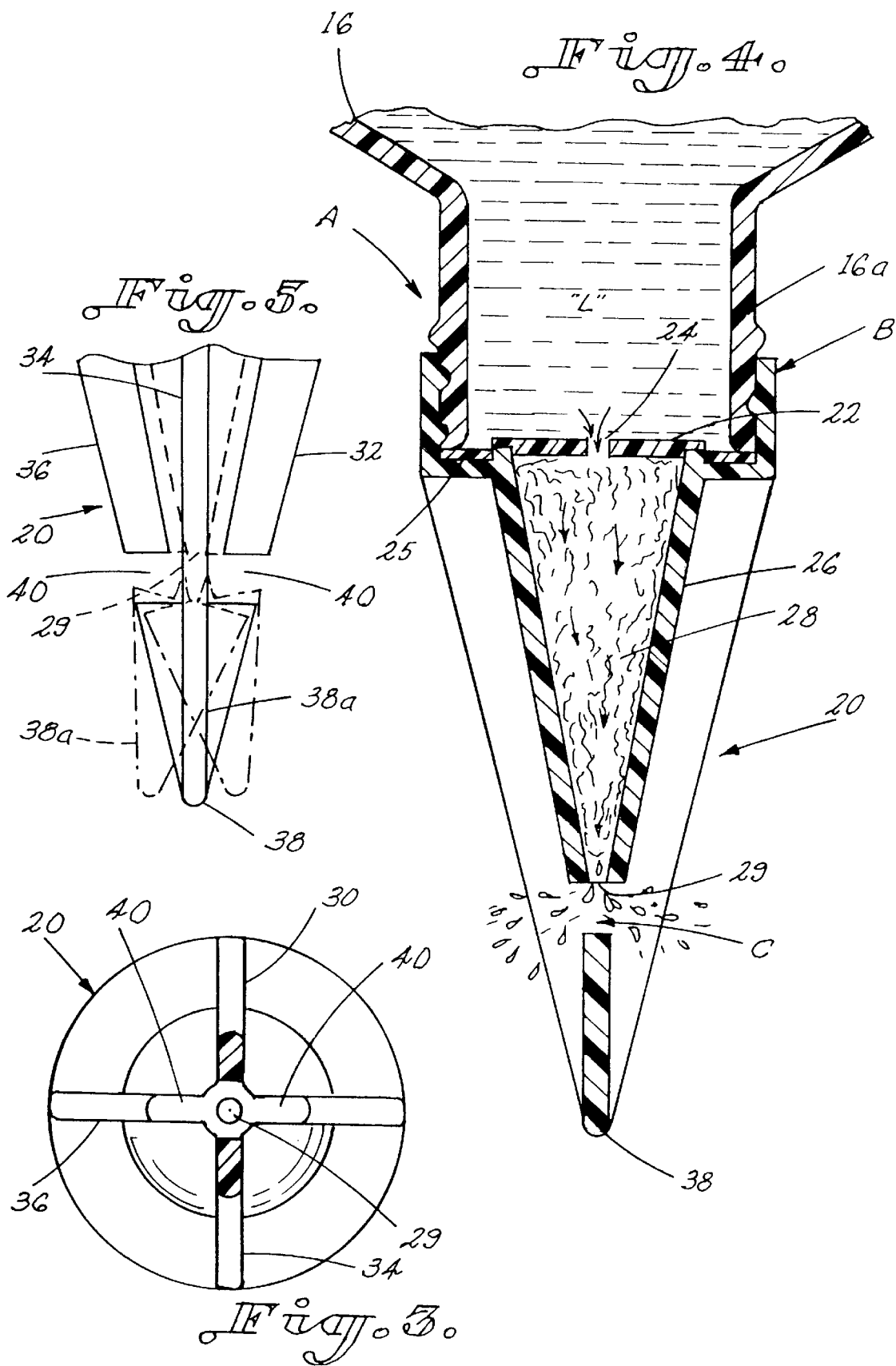

PLANT WATERING SYSTEM

BACKGROUND OF THE INVENTION

This invention relates to a system for watering plants either indoor or outdoor, and particularly, a system for feeding the root system of plants with reduced water evaporation which adequately waters the plant in a timed-release manner over a desired period of time.

Heretofore, prior systems have been proposed for automatically watering or feeding plants in a timed-release manner which is to sustain the plant for a period of time. For example, U.S. Pat. Nos. 5,568,701; 4,578,897; and 2,595,782 all disclose spikes which insert into the soil surrounding the plant roots for dispensing water or other liquid material, and a container is secured to the spikes for feeding the liquid. U.S. Pat. No. 4,089,133 discloses a device for feeding liquid to plants which includes a reservoir and an end tip which includes cotton material for dispensing the liquid over several days. U.S. Pat. No. 4,866,880 discloses a plant watering device having spirals to assist in the insertion of the device into the soil, and an inner sleeve having apertures which line up with apertures in the spiral sleeve for metering water. U.S. Pat. Nos. 5,542,605; 5,493,811; and 5,172,515 disclose other various watering and irrigation systems for plants of the like.

While the prior art devices have met with some success, problems of accurately metering a liquid in a timed-release matter to sustain a plant over a desired period of time is a problems to which considerable attention need be given. Not only is the metering systems in such relatively inexpensive devices hard to provide in a reliable manner, but the orifice through which the liquid is introduced in the soil often becomes clogged.

Accordingly, an important object of the present invention is to provide an improved plant watering system for indoor and outdoor plants which reliably meters a liquid into the soil near the roots of the plant in an accurate and reliable manner for sustaining the plant over a desired period of time.

Another important object of the present invention is to provide a plant watering system which includes a spike for insertion into the soil which forms a dispensing pocket generally devoid of soil for the reliable dispensing of water and, which reduces the tendency of the water dispensing orifice to clog.

Another important object of the present invention is to provide an improved watering system for plants and the like wherein liquid is dispensed over a time period in a highly reliable manner through a flow reduction and metering reservoir.

SUMMARY OF THE INVENTION

The above objectives are accomplished by providing a plant watering system for feeding the root system of a plant in the soil in a timed-release manner over a period of time using a liquid supply, and comprising a watering spike connected in fluid communication with the liquid supply for insertion into the soil. The watering spike includes an elongated barrel having a tip for insertion into the soil, and a metering orifice for receiving liquid from the liquid supply. A flow reduction reservoir receives metered liquid from the metering orifice. A liquid outlet dispenses liquid from the flow reduction reservoir into the soil.

Advantageously, the metering orifice has a diameter in the range of about 0.020 to 0.060, and preferably has a diameter of approximately 0.040 inches. The fluid transfer media includes a compressed cotton having a weight of approximately 1.81 grams. The cotton is pressed into the flow reduction reservoir at a pressure of about 20 psi. The metering orifice is of such a seize that pressure is maintained in the flow reduction chamber for an effective timed-release of liquid therefrom.

In an advantageous aspect of the invention, the spike barrel is conical and tapers toward the barrel tip, and the spike barrel includes a plurality of spiked blades for penetrating the soil and stabilizing the spike. At least one of the spike blades includes a blade notch for creating a liquid dispensive soil pocket generally devoid of soil when the spike is inserted into the soil. The blade notch and soil pocket communicate with the liquid outlet and so that liquid may be released through the pocket in a manner that clogging of the liquid outlet with soil is reduced or eliminated.

The spike blades are disposed at an intersecting angle relative to one another for stabilizing the spike in the soil A flex zone is created in a tip area between the blade notch and spike tip which enables the tip area of the barrel to flex and reduce injury in the event of contact with the tip.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a sectional view taken along line 3—3 of FIG. 2;

FIG. 4 is a sectional view taken along line 4—4 of FIG. 2; and,

FIG. 5 is an enlarged view of a tip of a water system spike which is flexible to reduce injury.

DETAILED DESCRIPTION OF A PREFERRED EMBODIMENT

Figures 1, 2:
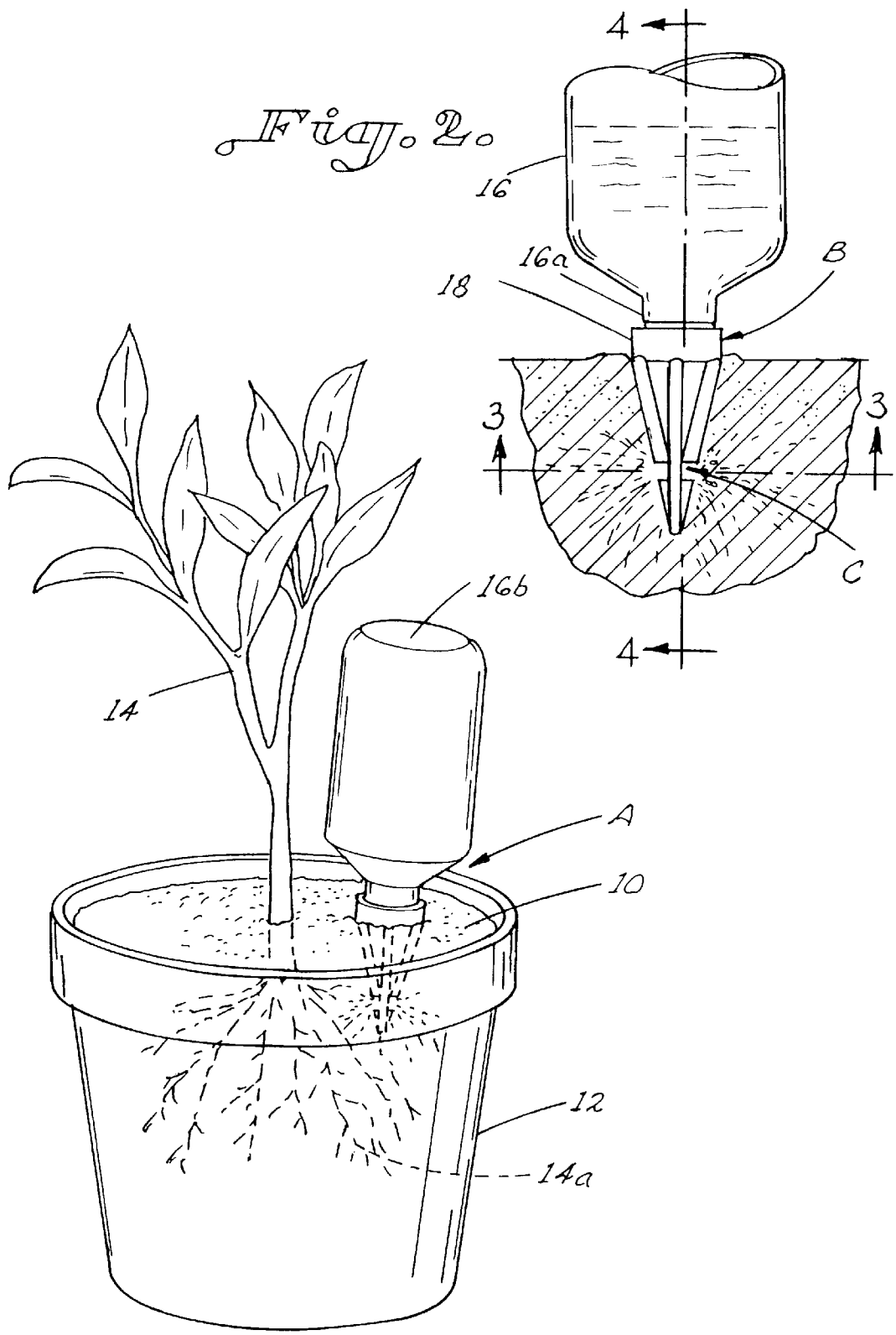
FIG. 1 is a perspective view of a plant watering system in accordance with the present invention.
FIG. 2 is a front elevation of a plant watering systems in accordance with the present invention wherein a spike of the system is inserted into the soil to form a clear pocket in the soil where the liquid can seep into the root system.

Referring now to the drawings, the invention will be described in more detail. In FIG. 1, a plant watering systems designated generally as A is illustrated which is inserted in the soil 10 contained within a pot 12 for feeding the root system 14a of a plant 14. The plant watering system may be utilized to water a plant in a timed-release manner either indoors or outdoors, whether the plant is in a container or the ground. FIG. 2 is an enlarged cross-section illustrating plant watering system A of the present invention which includes a liquid supply in container 16 in the form of a container having a neck 16a which is threaded into a cap 18 of a spike B of the present invention. In accordance with the present invention, it can be seen that spike B creates a soil pocket or trench designated generally as C, when inserted in the soil. The presence of soil in the soil pocket C is eliminated, or at least reduced substantially, so that liquid may be effectively and reliably dispensed through the pocket into the soil without clogging.

In accordance with further attributes of the invention, as can best be seen in FIG. 4, spike B is illustrated as including a barrel, designated generally as 20, which includes a disc 22 having a metering orifice 24 formed therein. A rubber gasket 25 is sandwiched between container 16a and spike cap 18. Liquid L from liquid supply 16 is metered through the orifice into a flow reduction reservoir 26 formed within the barrel of the spike. A fluid transfer media 28 is carried in the flow reduction reservoir which reduces the flow of liquid through the spike and meters the liquid, along with metering orifice 24, into the soil to provide a timed-release of the liquid for sustaining the plant over a desired time period.

As can best be seen in FIGS. 3 and 4, spike barrel 20 is provided in a conical shape and includes a plurality of radially extending spike blades 30, 32, 34, and 36 which likewise taper longitudinally toward a tip 38 of the spike barrel. The spike blades assist in inserting the spike and stabilizing the spike in this soil (FIGS. 1 and 2). Most importantly, it will be noted that a radial blade notch 40 is formed in each of the blades 32 and 36. This blade notch creates soil pocket C as the spike is inserted in the soil. Blades 36 and 32 form a correspondingly shaped trench in the soil as the spike is inserted. However, in the area of blade notch 40, the trench will be open from liquid outlet 29 through the blade thickness, and generally devoid of soil, so that the liquid may be reliably fed into the soil from the liquid outlet. In this manner, the clogging of liquid outlet 29 with soil, and the resulting failure of the watering system, is avoided.

In an important aspect of the invention, it can be seen in FIG. 5 not only do blade notches 40 assist in providing reliable watering by forming pockets in the soil, but they provide flexibility to a tip portion 38a of the spike between the notches and tip 38 which flexes, as can best be seen in FIG. 5. This reduces any injury in the event the spike is forced against the skin, such as if the spike is accidentally stepped on or stuck against the body. The remaining spike blades are not notched and solid. While four spike blades are illustrated, with two including notches, it is to be understood, of course, that other numbers of blades and notched blades may be utilized while providing the advantages of the invention. Spike B thus described is preferably made by injection molding the spike from a suitable inert plastic such as a medium density polyethylene, which also assists flexibility.

Referring now to FIG. 4, fluid transfer media 28 will be described. Fluid transfer media 28 is compressed cotton. Quite advantageously, it has been found that cotton weighing approximately 1.81 grams, and pressed into the conical reservoir 26 at a pressure of about 20 psi provides unexpected results in the accurate metering of water or other liquid is a timed-release manner over a desired period of time. The compressed cotton creates a flow reduction that will take several hours for the liquid to seep into the plant root system. In one example, a seven day watering system was provided in which reliable watering of a plant was accomplished to sustain the plant for a period of seven days using a 16 oz. Liquid container. While the liquid may actually be depleted in less than seven days, the amount of water sustains the plant for approximately seven days. Longer watering periods may be had using larger liquid supplies.

The diameter of metering orifice 24 has also been found to be critical in providing an effective timed-release of liquid for sustaining a plant. In the illustrated example, and in combination with the characteristics of the fluid transfer media disclosed, it has been found that a metering orifice of about 0.040 is an expedient. While this orifice might vary in a range of approximately 0.020 to 0.060, a diameter of 0.040 has found to be best. This diameter has been found to maintain a pressure on the liquid in compressed cotton 28 which allows for a reduced flow while moving the flow through the cotton and flow reduction reservoir. A push pin (not shown) may be provided to puncture the end 16b of container 16 to commence the gravity flow of liquid once the spike has been inserted into the soil.

While a preferred embodiment of the invention has been described using specific terms, such description is for illustrative purposes only, and it is to be understood that changes and variations may be made without departing from the spirit or scope of the following claims.

What is claimed is:

1. A plant watering system for feeding the root system of a plant in the soil in a timed-release manner over a time period comprising:

a liquid supply;

a watering spike connected in fluid communication with said liquid supply for insertion into the soil;

said watering spike including;

an elongated barrel having a tip for insertion into the soil, a metering orifice for receiving liquid from said liquid supply, a flow reduction reservoir receiving metered liquid from said metering orifice, and said reservoir containing a fluid transfer media, a liquid outlet through which liquid is dispensed from said flow reduction reservoir into said soil, said spike including a plurality of spike blades for insertion into the soil;

said spike blades being disposed at an intersecting angle relative to one another for stabilizing said spike in the soil;

wherein at least one of said spike blades includes a blade notch for creating a soil pocket when said spike is inserted in the soil which is generally devoid of soil which communicates with said liquid outlet so the liquid is reliably dispensed through said pocket into the soil; and a flex zone is created in a tip area of said blade notch which enables the tip area of said barrel to flex and reduce injury from contact with said tip.

2. The system of claim 1 wherein said metering orifice has a diameter in the range of 0.020 to 0.060 inches.

3. The system of claim 1 wherein said metering orifice has a diameter of approximately 0.040 inches.

4. The system of claim 1 wherein said spike barrel is conical and tapers toward said barrel tip.

5. The system of claim 4 wherein said spike barrel includes a plurality of spike blades for penetrating said soil and stabilizing said spike, and at least one of said spike blades forming a soil pocket generally devoid of soil when said spike is inserted into the soil through which the liquid is dispensed.

6. The system of claim 5 wherein said at least one of said spike blade includes a blade notch for communicating with said liquid outlet wherein said blade notch forms said soil pocket so that liquid may be released from said outlet and through said pocket in a manner that clogging of said liquid outlet with soil is reduced.

7. In a plant watering system for feeding the root system of a plant in the soil in a timed-release manner over a period of time from a liquid supply, comprising:

a watering spike connected in fluid communication to said liquid supply for insertion into the soil;

said watering spike including an elongated barrel having a tip for insertion into the soil and a metering orifice remote from said tip for receiving liquid from said liquid supply;

a flow reduction reservoir receiving metered liquid from said metering orifice, and said reservoir containing a fluid transfer media;

a liquid outlet disposed a distance from said tip which receives liquid from said flow reduction reservoir and dispenses said liquid into said soil, and a plurality of radially extending spike blades carried by said spike for penetrating said soil and stabilizing said spike, two of said spike blades being in opposed relation on either side of said reservoir including a notch formed in said blades and extending across said spike blades for creating a generally horizontal soil pocket generally devoid of soil when said spike is inserted into the soil and said blade notch communicating with said liquid outlet so that liquid may be released through said pocket in a manner that clogging of said liquid outlet with soil is reduced.

8. The system of claim 7 wherein said metering orifice has a diameter in the range of 0.020 to 0.060 inches.

9. The system of claim 8 wherein said metering orifice has a diameter of approximately 0.040 inches.

10. The system of claim 8 wherein said fluid transfer media includes a compressed cotton.

11. The system of claim 10 wherein said cotton has a weight of approximately 1.81 grams.

12. The system of claim 11 wherein said cotton is pressed into said flow reduction reservoir at a pressure of 20 psi.

13. The system of claim 7 wherein said spike barrel is conical and tapers toward said barrel tip and including a plurality of radially extending spike blades carried by said spike for penetrating said soil and stabilizing said spike.

14. The system of claim 7 wherein a flex zone is created in a tip area of said blade notch which enables the tip area of said barrel to flex and reduce injury by said tip.

15. A plant watering system for feeding the root system of a plant in the soil over a period of time in which the liquid is released from a liquid supply comprising:

a watering spike connected in fluid communication to said liquid supply for insertion into the soil;

said watering spike including an elongated barrel having a tip for insertion into the soil;

a metering orifice for receiving liquid from said liquid supply;

a flow reduction reservoir receiving metered liquid from said metering orifice;

a liquid outlet to which liquid is dispensed from said flow reduction reservoir into said soil;

said spike barrel being conical and tapers toward said barrel tip;

said spiked barrel includes a plurality of radially extending spike blades for penetrating said soil and stabilizing said spike, said spike blades forming a soil pocket generally devoid of soil when said spike is inserted into the soil through which said liquid is dispensed; and at least one of said spike blades including a blade notch extending across said spike blades for communicating with said liquid outlet and forming said soil pocket so that liquid may be released through said pocket in a manner that clogging of said liquid outlet with soil is prevented; and said metering orifice has a diameter in the range of 0.020 to 0.060 inches.

16. The system of claim 15 wherein said metering orifice has a diameter of approximately 0.040 inches.

17. The system of claim 16 including a fluid transfer media contained in said reservoir which includes a compressed cotton having a weight of approximately 1.81 grams.

18. The system of claim 17 wherein said cotton is pressed into said flow reduction reservoir at a pressure of 20 psi.

* * * * *